(12) United States Patent
Nishiyama et al.

(10) Patent No.: US 7,656,620 B2
(45) Date of Patent: Feb. 2, 2010

(54) MAGNETIC HEAD DEVICE PROVIDED WITH LEAD ELECTRODE ELECTRICALLY CONNECTED TO MAGNETIC SHIELD LAYER

(75) Inventors: Yoshihiro Nishiyama, Niigata-ken (JP); Yasuo Hayakawa, Niigata-ken (JP); Daigo Aoki, Niigata-ken (JP)

(73) Assignee: TDK Corporation, Tokyo (JP)

( * ) Notice: Subject to any disclaimer, the term of this patent is extended or adjusted under 35 U.S.C. 154(b) by 421 days.

(21) Appl. No.: 11/567,562

(22) Filed: Dec. 6, 2006

(65) Prior Publication Data

US 2007/0127157 A1 Jun. 7, 2007

(30) Foreign Application Priority Data

Dec. 6, 2005 (JP) .............................. 2005-351727

(51) Int. Cl.
 *G11B 5/11* (2006.01)
 *G11B 5/39* (2006.01)
(52) U.S. Cl. ........................................ 360/319; 360/322
(58) Field of Classification Search .................. 360/319, 360/322, 324.1, 324.11, 324.12, 324.2
 See application file for complete search history.

(56) References Cited

U.S. PATENT DOCUMENTS

| 5,784,224 | A * | 7/1998 | Rottmayer et al. | 360/324 |
| 6,538,856 | B1 * | 3/2003 | Gill | 360/319 |
| 6,807,032 | B1 * | 10/2004 | Seigler et al. | 360/319 |
| 7,463,455 | B2 * | 12/2008 | Funayama | 360/322 |
| 2001/0030840 | A1 * | 10/2001 | Shiraki et al. | 360/317 |
| 2002/0149887 | A1 * | 10/2002 | Sato | 360/319 |
| 2004/0125513 | A1 * | 7/2004 | Tanaka et al. | 360/319 |

FOREIGN PATENT DOCUMENTS

| JP | 2001-307307 | 11/2001 |
| JP | 2001-331908 | 11/2001 |
| JP | 2001-344708 | 12/2001 |
| JP | 2002-25017 | 1/2002 |
| JP | 2002-353538 | 12/2002 |
| JP | 2006-134488 | 5/2006 |

OTHER PUBLICATIONS

Office Action issued in corresponding Japanese Patent Application No. 2005-351727; issued May 20, 2008.

* cited by examiner

*Primary Examiner*—Jefferson Evans
(74) *Attorney, Agent, or Firm*—Brinks Hofer Gilson & Lione

(57) ABSTRACT

A lower shield layer has a substantially flat shape, and an upper shield layer has a front portion and a rear portion, where the front portion is disposed closer to the lower shield layer than the rear portion. A lower conductive electrode and an upper conductive electrode are disposed between the lower shield layer and the upper shield layer. The lower conductive electrode is electrically connected to the lower shield layer, and the upper conductive electrode is electrically connected to the upper shield layer. Since the lower and upper conductive electrodes are disposed between the upper and lower shield layers, each of the lower shield layer and the upper shield layer may be formed to have a small area and a simple shape.

6 Claims, 5 Drawing Sheets

MAGNETIC HEAD DEVICE PROVIDED WITH LEAD ELECTRODE ELECTRICALLY CONNECTED TO MAGNETIC SHIELD LAYER

RELATED APPLICATION

This application claims the benefit of Japanese Application 2005-351727, filed Dec. 6, 2005, which is hereby incorporated by reference herein.

TECHNICAL FIELD

The present disclosure relates to a magnetic head device using a detecting element in which a current flows in a layer thicknesswise direction using a GMR effect or a tunnel effect. More particularly, the present disclosure relates to a magnetic head device in which a structure of a current path is simple and an insulating effect may be improved.

BACKGROUND

Generally, for a magnetic head device using a detecting element that operates based on a GMR effect (giant magnetoresistance effect) or a tunnel effect, a sense current flows in a thicknesswise direction of the detecting element and the magnetic head is referred to as a current-perpendicular-to-the-plane (CPP)-type device.

The CPP-type magnetic head device includes a lower shield layer formed of a soft magnetic material on the bottom of a detecting element, and an upper shield layer formed of a soft magnetic material on the detecting element. A leakage magnetic flux from a magnetic recording medium in a middle region between both the lower shield layer and the upper shield layer is detected by the detecting element, so that magnetic information recorded on the magnetic recording medium may be read. To apply a current to the detecting element in a thicknesswise direction in this CPP-type magnetic head device, the detecting element may be electrically connected to the lower shield layer and the upper shield layer, and a current may be applied to the detecting element through the upper and lower shield layers.

However, according to the related art, a conductive layer (lead layer) that applies a current to a lower shield layer and an upper shield layer is generally provided at an inner side than a facing surface of a recording medium.

In a magnetic head device disclosed in JP-A-2001-307307, a portion of each of a lower shield layer and an upper shield layer continuously extends backward, which forms a conductive layer (lead layer). In a magnetic head device disclosed in JP-A-2002-25017, an upper shield layer and a lower shield layer are formed such that the lower shield layer has a larger area than the upper shield layer and a rear portion of the lower shield layer extends backward more than a rear portion of the upper shield layer, via-hole conductors are provided on the lower and upper shield layers, and a conductive layer (lead layer) that is electrically connected to each via-hole conductor is provided on an insulating layer covering the lower shield layer.

The lower shield layer and the upper shield layer have a function of transmitting a magnetic flux from a recording medium, preventing the magnetic flux from leaking into a region other than the detecting element, and restricting a magnetic signal to be read by the detecting element in a linear direction. In recent years, in a recording medium such as a hard disk or the like, a recording density, a reproducing speed of a signal recorded on the recording medium, and a frequency of a reproducing signal have been increased. Therefore, due to a magnetic resistance effect (MR effect) of each of the lower shield layer and the upper shield layer, reading precision of the detecting element may be reduced or noise may overlap reading signals. For this reason, it is preferable that each of the lower shield layer and the upper shield layer have an area as small as possible and a simple shape.

In the magnetic head device disclosed in JP-A-2001-307307, the lower shield layer and the upper shield layer integrally extend backward, thereby forming a conductive layer. As a result, the lower shield layer and the upper shield layer have complicated planar shapes that may cause noise. Further, since each of the lower shield layer and the upper shield layer is formed of a soft magnetic material, such as an alloy of Ni.Fe (alloy of nickel and iron), a direct current resistance is high, and a detection output calculated from the resistance variation may be reduced.

In the magnetic head device disclosed in JP-A-2002-25017, since the lower shield layer is formed to have a larger size than the upper shield layer, it is likely to provide unbalanced shielding effects between the lower shield layer and the upper shield layer, which affects reading precision of the detecting element. Further, noise may occur due to the large and complicated shape of the lower shield layer. Furthermore, via-hole conductors are formed in the lower shield layer and the upper shield layer, and a lead layer that is electrically connected to the lower shield layer and a lead layer that is electrically connected to the upper shield layer are formed at locations higher than the upper shield layer. Thus, the size of the entire magnetic head device is increased.

SUMMARY

Described herein is a magnetic head device that may have a lower shield layer and an upper shield layer each having a small size and a simple shape. Accordingly, it may be possible to reduce noise and achieve a small-sized magnetic head device, and also ensure a sufficient insulating property to form an electrode layer.

According to one aspect, a magnetic head device includes a lower shield layer formed of a soft magnetic material and an upper shield layer formed of a soft magnetic material. The upper shield layer is spaced apart from the lower shield layer. A detecting element is disposed between the lower shield layer and the upper shield layer, and when a current is applied to the detecting element in a thicknesswise direction, the lower shield layer and the upper shield layer form a current path. A lower conductive electrode and an upper conductive electrode are provided between the lower shield layer and the upper shield layer. The lower conducive electrode is electrically connected to the lower shield layer, and the upper conductive electrode is electrically connected to the upper shield layer. One or more insulating layers are respectively provided between the lower shield layer and the upper conductive electrode, and between the upper shield layer and the lower conductive electrode, such that the lower shield layer and the upper conductive electrode are insulated from each other, and the upper shield layer and the lower conductive electrode are insulated from each other.

Since the lower shield layer and the upper shield layer of the present magnetic head device can be formed to have a small area and a simple shape, such as a rectangular shape, noise occurring due to the lower shield layer and the upper shield layer may be reduced, and a reading precision of the detecting element may be improved.

DETAILED DESCRIPTION

Figure 1:
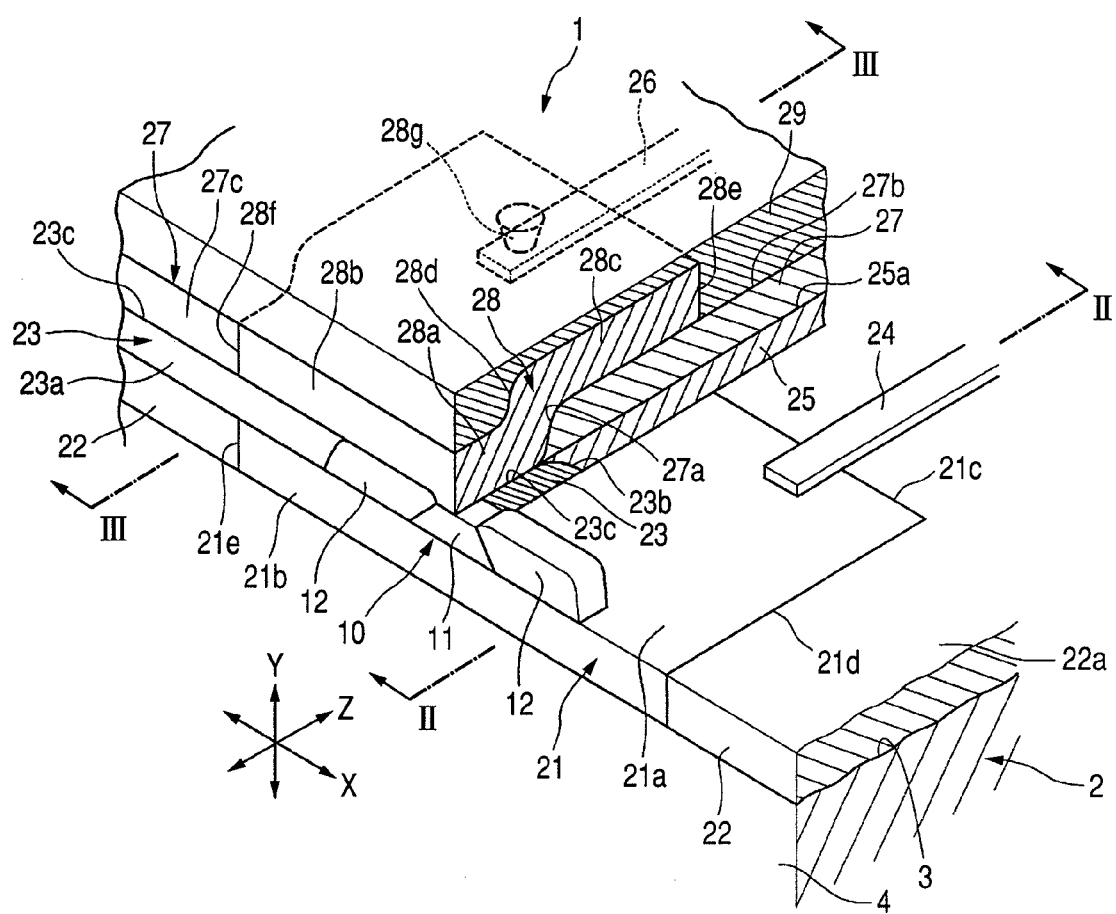
FIG. 1 is a partial sectional perspective view illustrating a magnetic head device according to a first embodiment.
Figure 2:
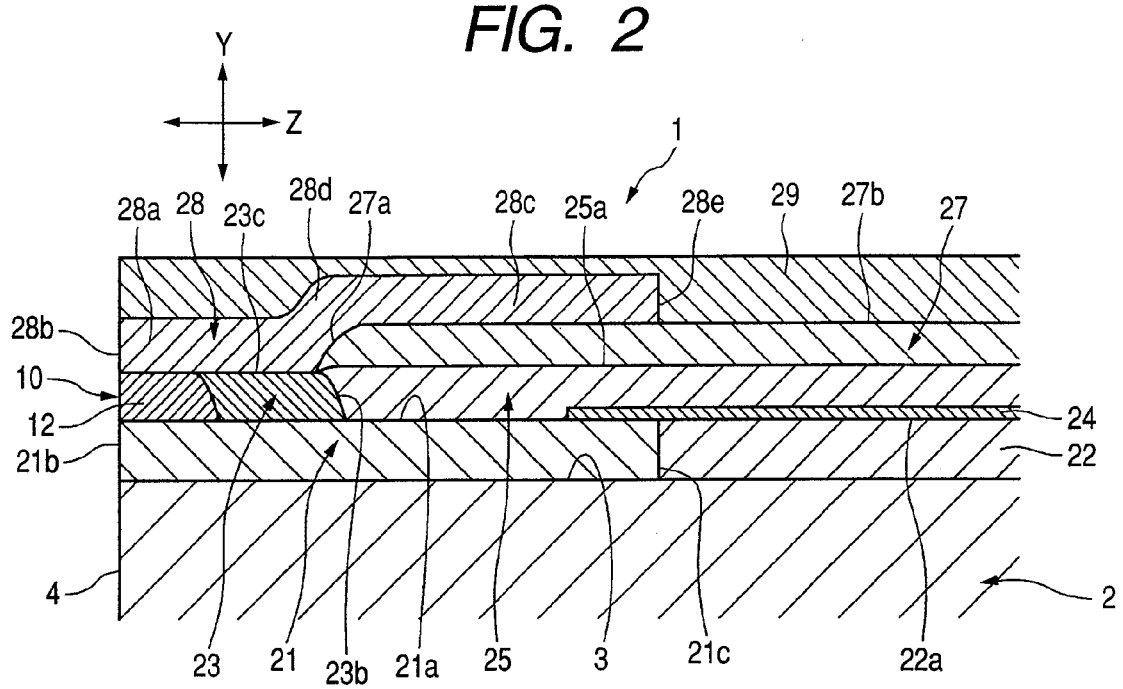
FIG. 2 is a cross-sectional view of a magnetic head device taken along the line II-II of FIG. 1.
Figure 3:
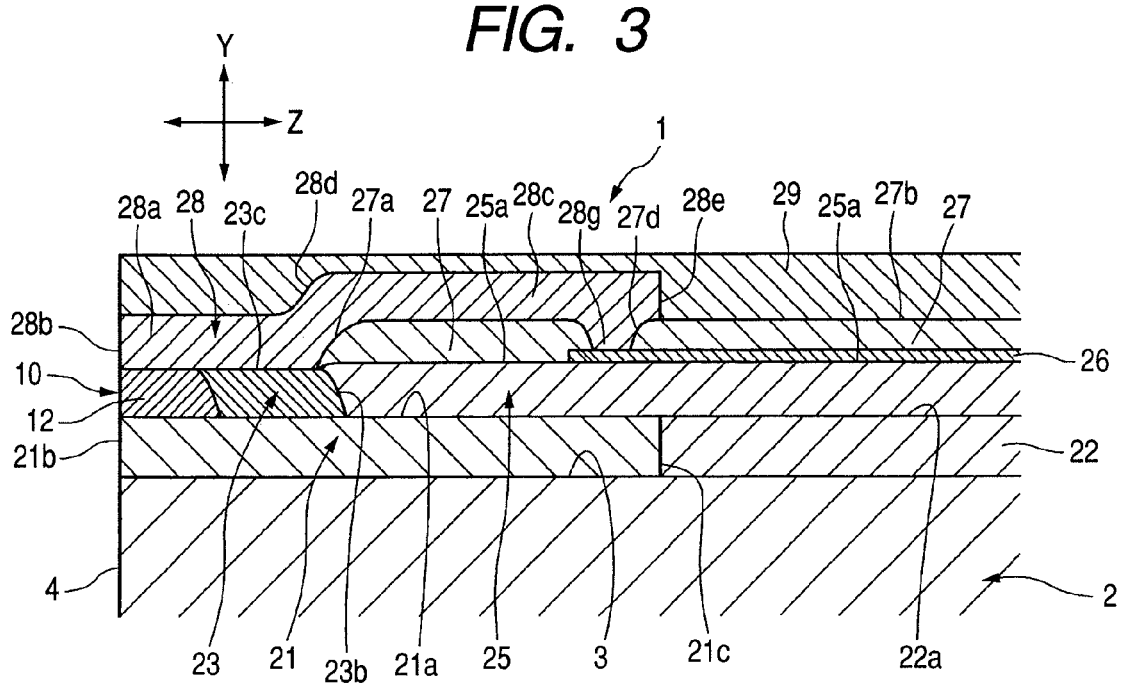
FIG. 3 is a cross-sectional view of a magnetic head device taken along the line III-III of FIG. 1.
Figure 7:
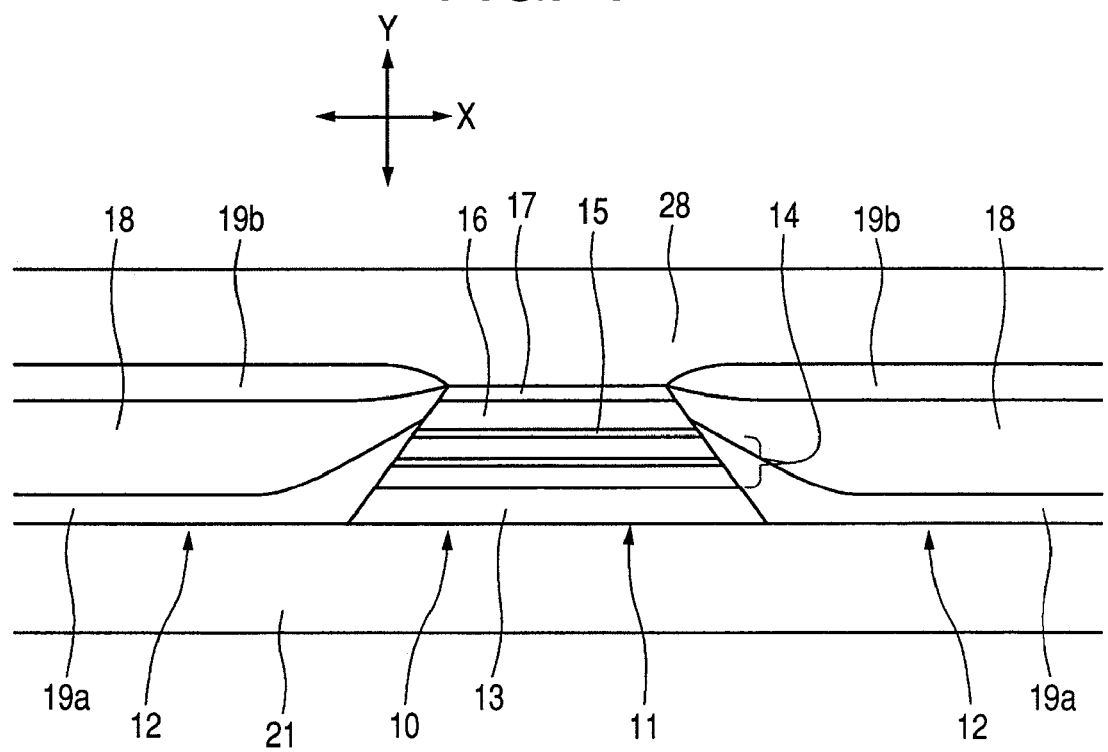
FIG. 7 is a front view of a detecting element, a lower shield layer and an upper shield layer, when viewed from a facing side of a recording medium.

FIG. 1 is a partial sectional perspective view illustrating a magnetic head device according to a first embodiment. FIG. 2 is a cross-sectional view of a magnetic head device taken along the line II-II of FIG. 1. FIG. 3 is a cross-sectional view of a magnetic head device taken along the line III-III of FIG. 1. FIG. 7 is a front view of a detecting element, a lower shield layer and an upper shield layer, when viewed from a facing side of a recording medium.

A magnetic head device 1 is formed on a trailing-side end face 3 of a slider 2 by means of a thin film process. The slider 2 is formed of a ceramic material such as $Al_2O_3.TiC$ (alumina and titanium carbide). A facing surface 4 is opposite to a magnetic recording medium, such as a hard disk or the like. In the slider 2, a surface opposite to the facing surface 4 is fixed to an elastically deformable flexure (not shown), and is supported by a front end of a supporter (not shown) called a load beam to be elastically deformable. When a recording medium rotates, the facing surface 4 floats from a surface of the recording medium due to an air flow (airbearing) between the surface of the recording medium and the facing surface 4, and a very small distance is obtained between the magnetic head device 1 and the surface of the recording medium. The leakage magnetic flux from a magnetic signal that is recorded on the recording medium is detected by the magnetic head device 1.

In FIGS. 1 to 3, a Y direction is the direction of motion of the recording medium, but is referred to as an upward and downward direction in the following description. Further, an X direction is a track widthwise direction of the magnetic signal recorded on the recording medium, but is referred to as a widthwise direction or a leftward and rightward direction in the below description. Furthermore, a Z direction is a direction in which a leakage magnetic flux from the recording medium flows, but is referred to as a depthwise direction or a forward and backward direction. Further, in the slider 2 for recording and reproducing, a magnetic head device for recording that is formed by a thin film process is formed to overlap a region on the magnetic head device 1, but the magnetic head for recording is not shown in FIG. 1.

A detecting element 10 is provided in the magnetic head device 1. FIG. 7 is a front view of the detecting element 10 when viewed from the Z direction. The detecting element 10 has a detecting unit 11 located at a central portion of the detecting element 10 in a widthwise direction (X direction), and bias units 12 that are respectively located at right and left sides of the detecting element 10.

As shown in FIG. 7, the detecting unit 11 includes an antiferromagnetic material layer 13, a pinned magnetic layer 14, a non-magnetic material layer 15, a free magnetic layer 16, and a protective layer 17, which are formed such that they sequentially overlie one another from a lower side (slider 2 side). Each of the antiferromagnetic material layer 13, the pinned magnetic layer 14, the non-magnetic material layer 15, the free magnetic layer 16, and the protective layer 17 is a thin film having a thickness measured in units of nm (nanometer) or units of Å (angstrom). The antiferromagnetic material layer 13 may be formed of, for example, an alloy of Ir.Mn (an alloy of iridium and manganese or IrMn alloy), or an alloy of Pt.Mn (alloy of platinum and manganese or a PtMn alloy). The pinned magnetic layer 14 has a laminated ferrimagnetic structure in which a lower layer may be made of an alloy of Co.Fe (alloy of cobalt and iron or a CoFe alloy), a middle layer may be made of Ru (ruthenium), and an upper layer may be made of an alloy of Co.Fe (CoFe alloy). The layers of the ferrimagnetic structure overlie one another. Due to exchange-coupling between the antiferromagnetic material layer 13 and the lower layer preferably made of a CoFe alloy that adheres closely to the antiferromagnetic material layer 13, the magnetization direction of the lower layer is pinned in a depthwise direction (z direction). Further, by an RKKY interaction through Ru, the magnetization direction of the upper layer preferably made of the CoFe alloy is fixed in a depthwise direction (Z direction) opposite to the magnetization direction of the lower layer.

When forming a CPP-GMR element making use of a giant magnetoresistance effect, the non-magnetic material layer 15 is a non-magnetic conductive layer, such as Cu (copper), and when forming a TMR element making use of a tunnel effect, the non-magnetic material layer 15 is a non-magnetic conductive layer, such as $Al_{2O3}$. The free magnetic layer 16 may be formed of an alloy of Ni.Fe (NiFe alloy) or the like, and the protective layer 17 may be formed of a conductive metallic material, such as Ta or the like.

Each of the bias units 12 includes a hard magnetic material layer 18 that may be made of an alloy of Co.Pt (alloy of cobalt.platinum or CoPt alloy), a non-magnetic insulating layer 19a that is formed on the bottom of the hard magnetic material layer 18 and may be made of $Al_2O_3$ or the like, and a non-magnetic layer 19b that is formed on the hard magnetic material layer 18 and may be made of Ta or the like. By means of a coercive force in the soft magnetic material layer 18, the magnetization of the free magnetic layer 16 forms a single magnetic domain in a widthwise direction (X direction). The magnetization direction of the free magnetic layer 16 varies due to the leakage magnetic field from the recording medium, and an electrical resistance of the detecting unit 11 varies according to the relative relationship between the magnetization direction of the free magnetic layer 16 and a direction of pinned magnetization of the pinned magnetic layer 14. A sensing current is applied to the detecting unit 11 in a thicknesswise direction (Y direction). By detecting the variation in a voltage due to the variation in the sensing current and the electrical resistance, a signal of the leakage magnetic field from the recording medium may be detected.

According to a structure of the magnetic head device 1, a lower shield layer 21 is provided on a trailing-side end face 3 of the slider 2. The lower shield layer 21 may be formed of a soft magnetic material, such as NiFe alloy or a CoFe alloy, by using a plating process. Although not shown in the drawing, an insulating layer, which is made of a non-magnetic material, such as $Al_2O_3$, is formed on the trailing-side end face 3 of the slider 2, and a plating base film made of Ni or the like may be formed on the insulating layer by using a sputtering process. On the plating base film, the lower shield layer 21 may be formed by plating a soft magnetic alloy.

In the lower shield layer 21, a top surface 21a is flat and is parallel to the trailing-side end face 3 of the slider 2. A front side surface 21b of the lower shield layer 21 is on the same plane as the facing surface 4 of the slider 2, and an inner side surface 21c of the lower shield layer 21 is parallel to the front side surface 21b. A right side surface 21d and a left side surface 21e of the lower shield layer 21 are parallel to each other, and are perpendicular to the inner side surface 21c and the front side surface 21b. The planar shape of the lower shield layer 21 when viewed from an upper side of a Y direction is rectangular. The detecting element 10 is formed to adhere closely to the top surface 21a of the lower shield layer 21, and the lower shield layer 21 and the antiferromagnetic material layer 13 of the detecting unit 11 are electrically connected to each other.

A lower insulating layer 22 is formed at a portion closer to an inner side than the inner side surface 21c of the lower shield layer 21, closer to a right side than the right side surface 21d, and closer to an outer side than the left side surface 21e. The lower insulating layer 22 may be formed of a non-magnetic inorganic material, such as $Al_2O_3$ or $SiO_2$, by using a sputtering process. The top surface 22a of the lower insulating layer 22 and the top surface 21a of the lower shield layer 21 are formed on the same plane.

As shown in FIGS. 1, 2, and 3, on an inner side of the detecting unit 11 and the bias units 12 and 12 that form the detecting element 10, a first insulating layer 23 may be formed of a non-magnetic inorganic material, such as $Al_2O_3$ or $SiO_2$, by using a sputtering process. A rear edge portion 23b of the first insulating layer 23 extends backward to be closer to an inner side than the detecting element 10. Further, the first insulating layer 23 is formed even in right and left side portions of the detecting element 10, and the front side surface 23a of the first insulating layer 23 is formed on the same plane as the facing surface 4 of the slider 2 at right and left sides of the detecting element 10.

As shown in FIGS. 1 and 2, a lower conductive electrode 24 is provided on the lower shield layer 21. The lower conductive electrode 24 is made of a conductive material that has a smaller specific resistance than a soft magnetic material forming the lower shield layer 21. Specifically, the lower conductive electrode 24 is formed of a material, such as Cu (copper), Au (platinum), W (tungsten), or the like. The lower conductive electrode 24 may be formed by using a plating process or a sputtering process. The lower conductive electrode 24 has a predetermined width in a region ranging from the top surface 21a of the lower shield layer 21 to the top surface 22a of the lower insulating layer 22, and the top surface 21a of the lower shield layer 21 and the top surface 22a of the lower insulating layer 22 are formed on the same plane. The lower conductive electrode 24 is formed to directly come into contact with the top surface 21a of the lower shield layer 21, and extends backward more than the inner side surface 21c of the lower shield layer 21.

Behind the first insulating layer 23, a second insulating layer 25 is formed. The second insulating layer 25 is formed of a non-magnetic inorganic material, such as $Al_2O_3$ or $SiO_2$, by using a sputtering process. Further, the second insulating layer 25 is formed on the top surface 21a of the lower shield layer 21 and the top surface 22a of the lower insulating layer 22 with a predetermined thickness. The lower conductive electrode 24 is covered by the second insulating layer 25. Further, the second insulating layer 25 is connected to a rear edge portion 23b of the first insulating layer 23. According to this embodiment, the thickness of the second insulating layer 25 is slightly larger than that of the first insulating layer 23. However, the thickness of the second insulating layer 25 may be equal to or smaller than that of the first insulating layer 23.

As shown in FIG. 3, an upper conductive electrode 26 is formed on the top surface 25a of the second insulating layer 25. The upper conductive electrode 26 may be formed of the same material as the lower conductive electrode 24 by using a process of the same kind as the lower conductive electrode 24.

A third insulating layer 27 is formed on the top surface 25a of the second insulating layer 25. The third insulating layer 27 may be formed of a non-magnetic inorganic material, such as $Al_2O_3$ or $SiO_2$, by using a sputtering process. Further, the third insulating layer 27 is formed over a region toward the inner side (away from the facing surface 4) from a location spaced apart from the rear end of the detecting element 10. The surface of the front end portion 27a of the third insulating layer 27 has a curved shape such that the surface of the front end portion 27a gradually retreats from the facing surface 4 as it is spaced apart from the trailing-side end face 3 of the slider 2. Further, the upper conductive electrode 26 underlies the third insulating layer 27.

At a location above and apart from the lower shield layer 21, the upper shield layer 28 is provided. The upper shield layer 28 may be formed of the same soft magnetic material as the lower shield layer 21 by using a plating process. That is, the plating base film made of Ni or the like may be formed by using a sputtering process, and a soft magnetic material may be deposited on the plating base film by plating, thereby forming the upper shield layer 28.

A front portion 28a of the upper shield layer 28 may be formed at a location closer to the lower shield layer 21 than that of the rear portion 28c of the upper shield layer 28. The bottom surface of the front portion 28a adheres closely to the top surfaces of the bias units 12 and the top surface of the detecting unit 11 forming the detecting element 10, and the upper shield layer 28 and the protective layer 17 of the detecting unit 11 are electrically connected to each other. Behind the detecting element 10 and in right and left directions parallel to the facing surface 4 beyond the detecting element 10, the front portion 28a is formed to adhere closely to the top surface 23c of the first insulating layer 23. Further, the front side surface 28b of the upper shield layer 28 is formed on substantially the same plane as the detecting element 10, the front side surface 21b of the lower shield layer 21, and the like.

A rear portion 28c of the upper shield layer 28 is formed such that it is disposed at a location spaced apart from the lower shield layer 21 and it adheres closely to the top surface 27b of the third insulating layer 27. The lower conductive electrode 24 and the upper conductive electrode 26 are located between the rear portion 28c and the lower shield layer 21.

A curved portion 28d may be formed at the interface between the front portion 28a and the rear portion 28c of the upper shield layer 28. The curved portion 28d may have a curvature corresponding to the curved shape of the front end portion 27a of the third insulating layer 27. That is, the distance between the curved portion 28d and the lower shield layer 21 gradually increases toward the inner side of the curved portion 28d or in a direction away from the facing surface 4. The inner side surface 28e of the upper shield layer 28 and the inner side surface 21c of the lower shield layer 21 are aligned with each other at the inner location thereof. As shown in FIG. 1, the left side surface 28f of the upper shield layer 28 is formed at the same location as the left side surface 21e of the lower shield layer 21, and the right side surface of the upper shield layer 28 is formed at the same location as the right side surface 21d of the lower shield layer 21. Accordingly, when viewed from an upper side of a Y direction, substantially the entire surfaces of the upper shield layer 28 and the lower shield layer 21 overlap each other, and thus a projection area in a plane of the upper shield layer 28 is substantially the same as that of the lower shield layer 21.

The third insulating layer 27 may extend outside the right side surface and the left side surface 28f of the upper shield layer 28, and the front end surface 27c of the third insulating layer 27 may be formed on substantially the same plane as the front end surface 28b of the upper shield layer 28.

As shown in FIG. 3, on the upper conductive electrode 26, a defective portion 27d is formed in the third insulating layer 27. The defective portion 27d may be formed by partially performing an ion milling process on the third insulating layer 27 and removing a portion of the third insulating layer 27. A portion of the upper shield layer 28 that is formed on the third insulating layer 27 is inserted into the defective portion 27d as a conductive portion 28g, and the upper conductive electrode 26 and the upper shield layer 28 are electrically connected to each other.

An upper insulating layer 29 is formed on the upper shield layer 28 and the third insulating layer 27. The upper insulating layer 29 may be formed of the same material as the lower insulating layer 22, the first insulating layer 23, the second insulating layer 25, and the third insulating layer 27 by using a similar process. Further, a magnetic head device for recording overlies the upper insulating layer 29.

In the magnetic head device 1, a current flows through a path of the lower conductive electrode 24, the lower shield layer 21, the detecting unit 11, the upper shield layer 28, and the upper conductive electrode 26, and in the detecting unit 11, a current flows in a thickness direction thereof (Y direction). The lower conductive electrode 24 and the upper conductive electrode 26 are disposed between the lower shield layer 21 and the upper shield layer 28 in a region where the lower shield layer 21 and the upper shield layer 28 overlap each other. In addition, each of the lower conductive electrode 24 and the upper conductive electrode 26 extends backward farther than the inner side surface 21c of the lower shield layer 21 and the inner side surface 28e of the upper shield layer 28.

Since the lower conductive electrode 24 and the upper conductive electrode 26 extend backward between the lower shield layer 21 and the upper shield layer 28, a structure for extracting a current to the outside does not need to be provided in the lower shield layer 21 and the upper shield layer 28. Accordingly, each of the lower shield layer 21 and the upper shield layer 28 may have a simple shape. Further, it is not required that a bump or the like extends upward from the lower shield layer 21 or the upper shield layer 28 so as to form a current path. Since the current supply path to the lower shield layer 21 and the upper shield layer 28 is not disposed above the upper shield layer 28, when the magnetic head device for recording is formed on the upper insulating layer 29 by using a thin film process, the lower conductive electrode 24 and the upper conductive electrode 26 do not interfere with the magnetic head device for recording. For this reason, the lower shield layer 21 and the upper shield layer 28 do not need to extend to the inner side (side spaced apart from the facing surface 4). Therefore, the inner side surface 21c of the lower shield layer 21 and the inner side surface 28e of the upper shield layer 28 may be disposed at locations close to the facing surface 4, which reduces the respective areas of the lower shield layer 21 and the upper shield layer 28.

Further, all of the lower shield layer 21 and the upper shield layer 28 may have a rectangular shape. When the lower shield layer 21 and the upper shield layer 28 are viewed from an upper side of a Y direction, the projected planar shape of the upper shield layer 28 and the projected planar shape of the lower shield layer 21 are rectangular and the shapes are not complicated.

Since the lower shield layer 21 and the upper shield layer 28 are formed of a soft magnetic material, such as a NiFe alloy or a CoFe alloy, they show a magnetoresistance effect. The lower shield layer 21 and the upper shield layer 28 can be formed as small as possible, and the shapes thereof can be simplified, which suppresses a noise from occurring due to magnetoresistance effects of the lower shield layer 21 and the upper shield layer 28. Further, since all of the lower shield layer 21 and the upper shield layer 28 may have the small size and the simple structure, when the upper and lower shield layers are formed, it may be possible to avoid a plating defect. Further, it may be possible to effectively achieve a shielding effect of the lower shield layer 21 and the upper shield layer 28.

Further, since the lower shield layer 21 has a flat shape and the distance between the front portion 28a of the upper shield layer 28 and the lower shield layer 21 is small, the upper shield layer 28 can come into direct contact with the top surface of the small-sized detecting unit 11, and a conductive resistance can be reduced. Since a sufficiently large gap is formed between the rear portion 28c of the upper shield layer 28 and the lower shield layer 21, the lower conductive electrode 24 and the upper conductive electrode 26 that are located between the lower shield layer 21 and the upper shield layer 28 may be sufficiently insulated from the lower and upper shield layers 21 and 28. By forming the upper shield layer 21 with the above-described shape, even though the detecting unit 11 has a small size in a Y direction, a current may be supplied to the detecting unit 11 from the shield layers, and an insulating property between the lower and upper conductive electrodes 24 and 26 may be ensured.

Further, since the upper shield layer 28 forms the curved portion 28d between the front portion 28a and the rear portion 28c, even though the front portion 28a and the rear portion 28c are different from each other in location in a heightwise direction, a shielding effect of the upper shield layer 28 is not damaged on a large scale.

Figure 4:
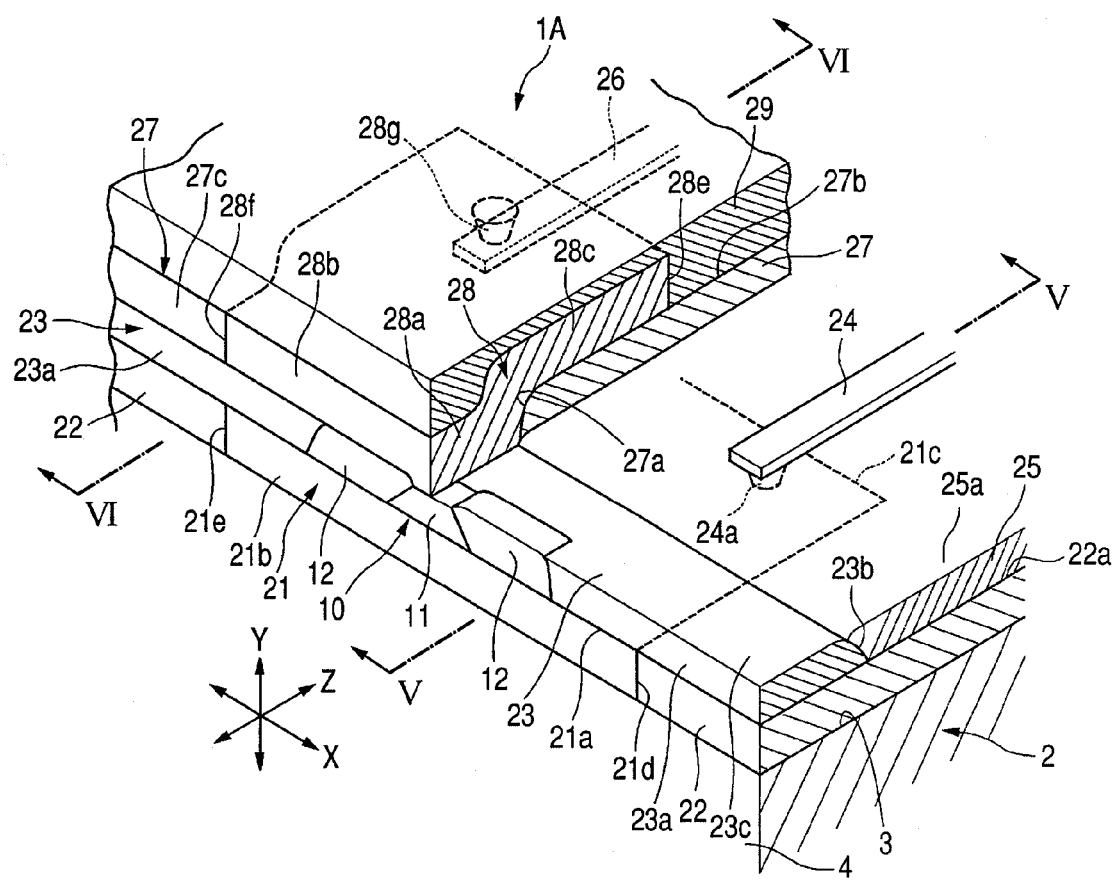
FIG. 4 is a partial sectional perspective view illustrating a magnetic head device according to a second embodiment.
Figure 5:
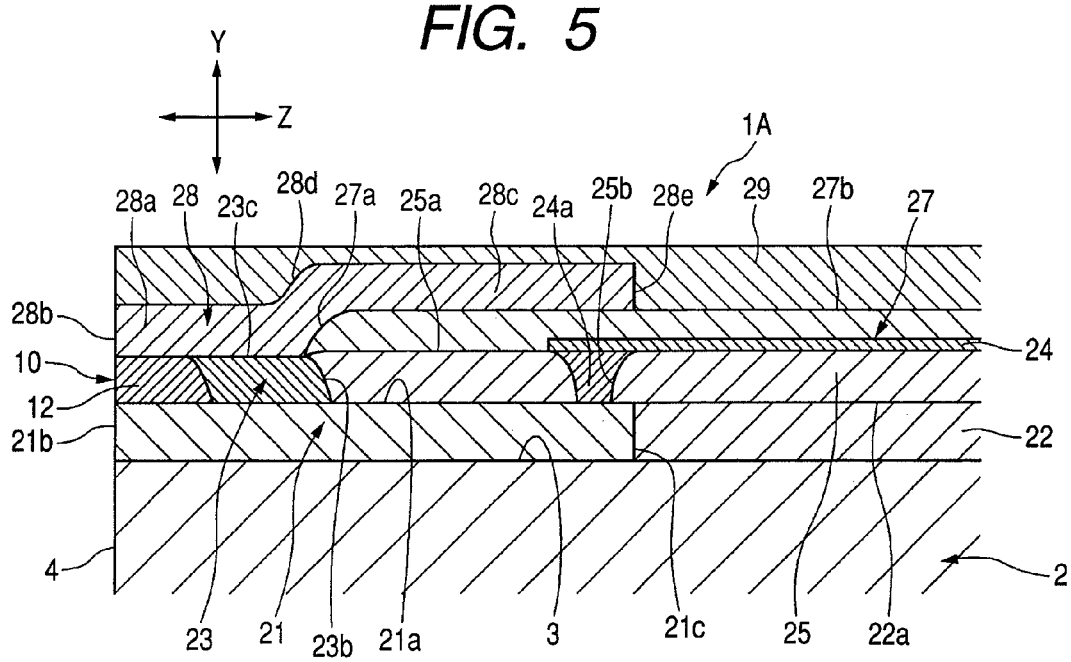
FIG. 5 is a cross-sectional view of a magnetic head device taken along the line V-V of FIG. 4.
Figure 6:
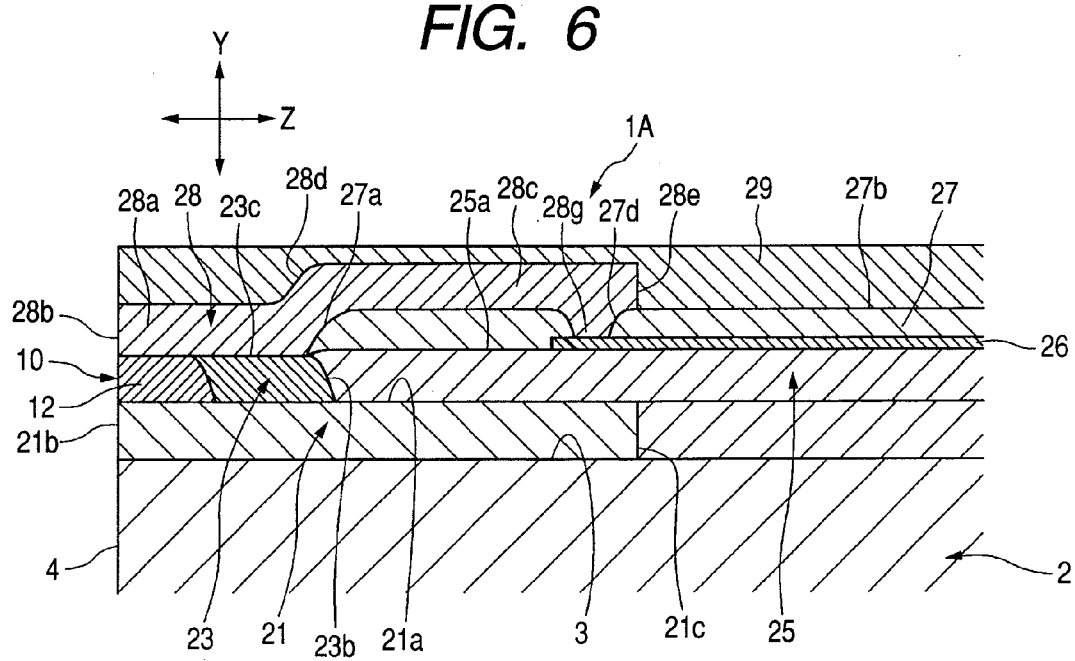
FIG. 6 is a cross-sectional view of a magnetic head device taken along the line VI-VI of FIG. 4.

FIG. 4 is a partial sectional perspective view illustrating a magnetic head device 1A according to a second embodiment. FIG. 5 is a cross-sectional view of the magnetic head shown in FIG. 4 taken along the line V-V. FIG. 6 is a cross-sectional view of the magnetic head shown in FIG. 4 taken along the line VI-VI.

In the following description, differences between the magnetic head device 1A according to the second embodiment and the magnetic head device 1 according to the first embodiment will be described. Further, in FIGS. 4 to 6, the same constituent elements as the magnetic head device 1 according to the first embodiment are denoted by the same reference numerals, and the description thereof will be omitted.

The magnetic head device 1A according to the second embodiment shown in FIGS. 4 to 6 is the same as the magnetic head device 1 according to the first embodiment in terms of structures and materials of the constituent portions, such as the detecting element 10, the lower shield layer 21, the upper shield layer 28, and the like. However, the magnetic head device 1A according to the second embodiment differs from the magnetic head device 1 according to the first embodiment in terms of the arrangement of the lower conductive electrode 24 and the upper conductive electrode 26.

As shown in FIGS. 5 and 6, the lower conductive electrode 24 and the upper conductive electrode 26 are formed on the top surface 25a of the second insulating layer 25. The lower conductive electrode 24 and the upper conductive electrode 26 may be formed to extend linearly and to be parallel to each other in a Z direction with a predetermined gap in an X direction. Since the upper conductive electrode 24 and the upper conductive electrode 26 are formed on the top surface 25a of the second insulating layer 25, the lower and upper conductive electrodes 24 and 26 can be formed by the same process at the same time, and the manufacturing process of the magnetic head device 1A may be simplified.

As shown in FIG. 5, in the second insulating layer 25, the defective portion 25b may be formed by an ion milling process. A conductive portion 24a that electrically connects the lower conductive electrode 24 and the lower shield layer 21 is formed in the defective portion 25b. The conductive portion 24a may be formed by depositing a low resistive material, such as Cu, Au, W, or the like. Further, at the portions other than the conductive portion 24a, the lower conductive electrode 24 and the lower shield layer 21 are electrically insulated from each other with the second insulating layer 25 therebetween, and the lower conductive electrode 24 and the upper shield layer 28 are electrically insulated from each other with the third insulating layer 27 therebetween.

As shown in FIG. 6, the defective portion 27d is formed in the third insulating layer 27. Similar to the first embodiment shown in FIG. 3, the upper conductive electrode 26 and the upper shield layer 28 are electrically connected to each other through the conductive portion 28g that is formed in the defective portion 27d. At portions other than the conductive portion 28g, the upper conductive electrode 26 and the upper shield layer 28 are electrically insulated from each other with the third insulating layer 27 therebetween, and the upper conductive electrode 26 and the lower shield layer 21 are insulated from each other with the second insulating layer 25 therebetween.

In the magnetic head device 1A according to the second embodiment, the lower conductive electrode 24 and the upper conductive electrode 26 can be formed in the same plane by the same process at the same time. In addition, the second insulating layer 25 may be provided on the bottom of the lower conductive electrode 24 and the upper conductive electrode 26, and the third insulating layer 27 may be provided on the lower conductive electrode 24 and the upper conductive electrode 26, which may ensure a sufficient insulating property between the lower shield layer 21 and the rear portion 28c of the upper shield layer 28.

Further, since the lower conductive electrode 24 and the upper conductive electrode 26 may be formed at the same height, a thickness of each of the second insulating layer 25 and the third insulating layer 27 can be minimized. In this case, even though the lower shield layer 21 and the rear portion 28c of the upper shield layer 28 may be disposed closer to each other, it is possible to ensure an insulating property between the lower conductive electrode 24 and the upper conductive electrode 26, and the lower shield layer 21 and the upper shield layer 28. As a result, the difference in height between the front portion 28a and the rear portion 28c of the upper shield layer 28 may reduced, or the upper shield layer 28 may be formed to have a flat shape without the curved portion 28d.

The invention claimed is:

1. A magnetic head device comprising:
a lower shield layer formed of a soft magnetic material;
an upper shield layer formed of a soft magnetic material and spaced apart from the lower shield layer;
a detecting element disposed between the lower shield layer and the upper shield layer, a current being applied to the detecting element in a thicknesswise direction, the lower shield layer and the upper shield layer forming a current path;
a lower conductive electrode and an upper conductive electrode provided between the lower shield layer and the upper shield layer, the lower conductive electrode being electrically connected to the lower shield layer, the upper conductive electrode being electrically connected to the upper shield layer; and
one or more insulating layers respectively provided between the lower shield layer and the upper conductive electrode, and between the upper shield layer and the lower conductive electrode, such that the lower shield layer and the upper conductive electrode are insulated from each other, and the upper shield layer and the lower conductive electrode are insulated from each other;
wherein the lower conductive electrode is formed at a location directly adjacent to a top surface of the lower shield layer,
the upper conductive electrode faces a bottom surface of the upper shield layer with one of the insulating layers therebetween, and
the upper conductive electrode and the upper shield layer are electrically connected to each other through a defective portion of the insulating layer disposed therebetween.

2. The magnetic head device according to claim 1, wherein a spacing between the lower shield layer and the upper shield layer at a front portion of the upper shield layer where the detecting element is provided is smaller than a spacing between the lower shield layer and the upper shield layer at a rear portion of the upper shield layer where the lower conductive electrode and the upper conductive electrode are disposed.

3. The magnetic head device according to claim 2, wherein a top surface of the lower shield layer is substantially flat, and
the upper shield layer includes a curved portion connecting the front portion of the upper shield layer to the rear portion.

4. A magnetic head device comprising:
a lower shield layer formed of a soft magnetic material;
an upper shield layer formed of a soft magnetic material and spaced apart from the lower shield layer;
a detecting element disposed between the lower shield layer and the upper shield layer, a current being applied to the detecting element in a thicknesswise direction, the lower shield layer and the upper shield layer forming a current path;
a lower conductive electrode and an upper conductive electrode provided between the lower shield layer and the upper shield layer, the lower conductive electrode being electrically connected to the lower shield layer, the upper conductive electrode being electrically connected to the upper shield layer; and
one or more insulating layers respectively provided between the lower shield layer and the upper conductive electrode, and between the upper shield layer and the lower conductive electrode, such that the lower shield layer and the upper conductive electrode are insulated from each other, and the upper shield layer and the lower conductive electrode are insulated from each other;
wherein the lower conductive electrode and the upper conductive electrode are disposed on the same plane, respectively,
a first insulating layer is provided between the lower conductive electrode and the upper conductive electrode, and the lower shield layer,
a second insulating layer is provided between the lower conductive electrode and the upper conductive electrode, and the upper shield layer, the lower conductive electrode and the lower shield layer are electrically connected to each other through a defective portion that is formed in the first insulating layer, and, the upper conductive electrode and the upper shield layer are electrically connected to each other through a defective portion that is formed in the second insulating layer.

5. The magnetic head device according to claim 4,
wherein a spacing between the lower shield layer and the upper shield layer at a front portion of the upper shield layer where the detecting element is provided is smaller than a spacing between the lower shield layer and the upper shield layer at a rear portion of the upper shield layer where the lower conductive electrode and the upper conductive electrode are disposed.

6. The magnetic head device according to claim 5,
wherein a top surface of the lower shield layer is substantially flat, and the upper shield layer includes a curved portion connecting the front portion of the upper shield layer to the rear portion.

* * * * *